United States Patent
Hasegawa (10) Patent No.: US 7,035,407 B1
(45) Date of Patent: Apr. 25, 2006

(54) DATA TRANSMISSION SYSTEM FOR PREVENTION OF UNAUTHORIZED COPY OF DATA FROM RECORDING MEDIUM

(75) Inventor: Satoshi Hasegawa, Tokyo (JP)

(73) Assignee: NEC Corporation, (JP)

( * ) Notice: Subject to any disclaimer, the term of this patent is extended or adjusted under 35 U.S.C. 154(b) by 0 days.

(21) Appl. No.: 09/306,110

(22) Filed: May 6, 1999

(30) Foreign Application Priority Data

May 11, 1998 (JP) .................................. 10-127907

(51) Int. Cl.
*H04L 9/00* (2006.01)
*H04K 1/00* (2006.01)

(52) U.S. Cl. ........................................ 380/37; 713/194

(58) Field of Classification Search .............. 711/147; 712/32; 713/189; 380/262, 42; 705/75; 341/67, 65, 106
See application file for complete search history.

(56) References Cited

U.S. PATENT DOCUMENTS

| | | | | |
|---|---|---|---|---|
| 3,715,489 A | * | 2/1973 | Brown et al. ............ | 348/440.1 |
| 4,157,454 A | * | 6/1979 | Becker ........................ | 380/37 |
| 4,268,715 A | * | 5/1981 | Atalla ........................ | 705/75 |
| 4,316,055 A | * | 2/1982 | Feistel ........................ | 380/37 |
| 4,322,576 A | * | 3/1982 | Miller ........................ | 380/29 |
| 4,531,021 A | * | 7/1985 | Bluestein et al. ........... | 380/239 |
| 5,132,955 A | * | 7/1992 | Hanson .................... | 369/47.16 |
| 5,412,730 A | * | 5/1995 | Jones ......................... | 380/46 |

(Continued)

FOREIGN PATENT DOCUMENTS

JP 02087199 A * 3/1990

(Continued)

OTHER PUBLICATIONS

Japanese Office Action issued May 9, 2000 a related application with English translation of relevant portions.

*Primary Examiner*—Christopher Revak
(74) *Attorney, Agent, or Firm*—Dickstein, Shapiro, Morin & Oshinsky, LLP.

(57) ABSTRACT

A data transmission system is provided to transmit data streams recorded on recording media to the external system or device. Herein, an original data stream read from a recording medium is subjected to calculation using a variable selected from a variable set which consists of a number of variables and which is created by each cycle. A variable change code is provided to represent the variable selected from the variable set. Then, a calculated data stream is temporarily stored on a stream buffer together with the variable change code. The calculated data stream is output from the stream buffer and is subjected to inverse calculation using the same variable designated by the variable change code. Using the inverse calculation, it is possible to reproduce the data stream, which is then processed. Thereafter, the data transmission system outputs the processed data stream. Because the calculated data stream is stored on the stream buffer, it is difficult for the third party to easily capture the original data stream from the stream buffer. In addition, the variable used for the calculation and inverse calculation is changed in each cycle, so that it is difficult for the third party to decode the calculated data stream to the original data stream. Therefore, it is possible to prevent the third party to easily produce an unauthorized copy of the data streams recorded on the recording medium from the stored content of the stream buffer.

13 Claims, 6 Drawing Sheets

U.S. PATENT DOCUMENTS

| | | | | |
|---|---|---|---|---|
| 5,703,948 | A | * | 12/1997 | Yanovsky .................... 380/262 |
| 5,917,830 | A | * | 6/1999 | Chen et al. ................. 370/487 |
| 5,920,627 | A | * | 7/1999 | Mionet et al. ............... 713/163 |
| 6,160,785 | A | * | 12/2000 | Hutter .................... 369/124.09 |
| 6,330,675 | B1 | * | 12/2001 | Wiser et al. ................ 713/189 |
| 6,570,989 | B1 | * | 5/2003 | Ohmori et al. ............... 380/42 |
| 2002/0080972 | A1 | * | 6/2002 | Kato et al. .................. 380/277 |
| 2004/0006703 | A1 | * | 1/2004 | Kitani et al. ................ 713/193 |

FOREIGN PATENT DOCUMENTS

| | | | |
|---|---|---|---|
| JP | 2-55752 | | 4/1990 |
| JP | 6-105032 | | 4/1994 |
| JP | 8-237596 | | 9/1996 |
| JP | 9-130733 | | 5/1997 |
| JP | 09128475 A | * | 5/1997 |
| JP | 10-106148 | | 4/1998 |

* cited by examiner

DATA TRANSMISSION SYSTEM FOR PREVENTION OF UNAUTHORIZED COPY OF DATA FROM RECORDING MEDIUM

BACKGROUND OF THE INVENTION

1. Field of the Invention

This invention generally relates to data transmission systems which use intermediate buffer memories to transmit data from recording media. Particularly, this invention relates to the data transmission systems provided for prevention of unauthorized copy of the data of the recording media which are captured from stored contents of the intermediate buffer memories.

This application is based on Patent Application No. Hei 10-127907 filed in Japan, the content of which is incorporated herein by reference.

2. Description of the Related Art

There are provided a variety of methods and apparatuses for prevention of digital copying of data, as follows:

The paper of Japanese Patent Application, Publication No. Hei 6-105032 discloses an example of an image forming device managing system, wherein download of image data to a copying machine is temporarily stopped until completion of copying while received image data are temporarily stored in a buffer memory so that they are transferred to a main memory after completion in reception of the image data. Thus, it is possible to perform download of the data to the copying machine with a short period of time in communications, while it is possible to prevent abnormal copying which occur when a copy is started before transfer of the image data is completed.

The paper of Japanese Patent Application, Publication No. Hei 8-237596 discloses an example of a method and apparatus for copy prevention in a digital magnetic recording/reproduction system, wherein a copy authorization is detected using a marker which is formed by a control word for scrambling audio and video bit streams and copy protection (CP) information used for prevention of unauthorized copy and which is subjected to encryption using a cipher key and is recorded on a video tape, for example. Herein, the control word is reproduced from the marker and is subjected to descrambler to enable display on a monitor.

Conventionally, some of the data transmission systems or data communication systems normally use intermediate buffer memories to transmit data from one location to another. However, such data transmission system is not always capable of processing all data streams stored in the intermediate buffer memory at a time. Particularly, in the case of the software processing, the system captures a limited amount of data, which can be processed at one time, among all of the data accumulated in the intermediate buffer memory. So, the system processes limited amounts of data successively.

Figure 6:
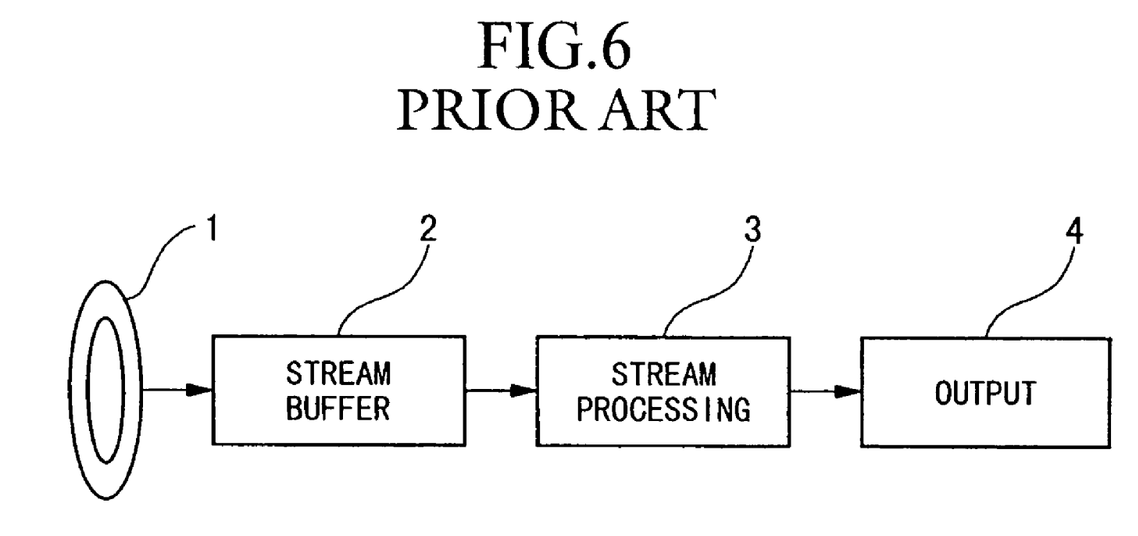
FIG. 6 is a block diagram showing a configuration of the conventional data transmission system.

FIG. 6 is a block diagram showing an example of the conventional data transmission system in which data stream processing is performed by means of an intermediate buffer memory.

In FIG. 6, data streams are read from a recording medium (or recording media) 1 and are temporarily stored in a stream buffer 2 to an extent that they will not overflow. Then, a stream processing unit 3 accesses the stream buffer 2 to capture an amount of the data stream(s), which can be processed at one time. So, the stream processing unit 3 processes amounts of the data streams successively. Thereafter, processing results of the data streams are output to an output unit 4, which in turn provides corresponding outputs to the external device or system (not shown).

In the aforementioned system, it is possible to easily capture the stored content of the intermediate buffer memory (i.e., stream buffer 2) by the known techniques such as the memory snapshot. So, it is possible to make a duplication with ease. However, this raises a problem in protection of the copy right. So, it is strongly demanded to provide a solution in the protection of the copy right with respect to the data transmission system which uses the intermediate buffer memory for transmission (or communication) of data from the recording medium.

SUMMARY OF THE INVENTION

It is an object of the invention to provide a data transmission system that is capable of preventing unprocessed data streams of a recording medium from being captured from an intermediate buffer memory so that an unauthorized copy will not be made with ease.

This invention provides a data transmission system which is basically designed to transmit data streams recorded on recording media to the external system or device. Herein, an original data stream read from a recording medium is subjected to calculation using a variable selected from a variable set which consists of a number of variables and which is created by each cycle. In addition, a variable change code is provided to represent the variable selected from the variable set. The calculated data stream is temporarily stored on an intermediate buffer memory together with the variable change code. Then, the calculated data stream is output from the intermediate buffer memory and is subjected to inverse calculation using the same variable designated by the variable change code. Using the inverse calculation, it is possible to reproduce the data stream, which is then processed. Thereafter, the data transmission system outputs the processed data stream.

Because the calculated data stream is stored on the intermediate buffer memory, it is difficult for the third party to easily capture the original data stream from the intermediate buffer memory. In addition, the variable used for the calculation and inverse calculation is changed in each cycle, so that it is difficult for the third party to decode the calculated data stream to the original data stream. Therefore, it is possible to prevent the third party to easily produce an unauthorized copy of the original data stream recorded on the recording medium from the stored content of the intermediate buffer memory.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
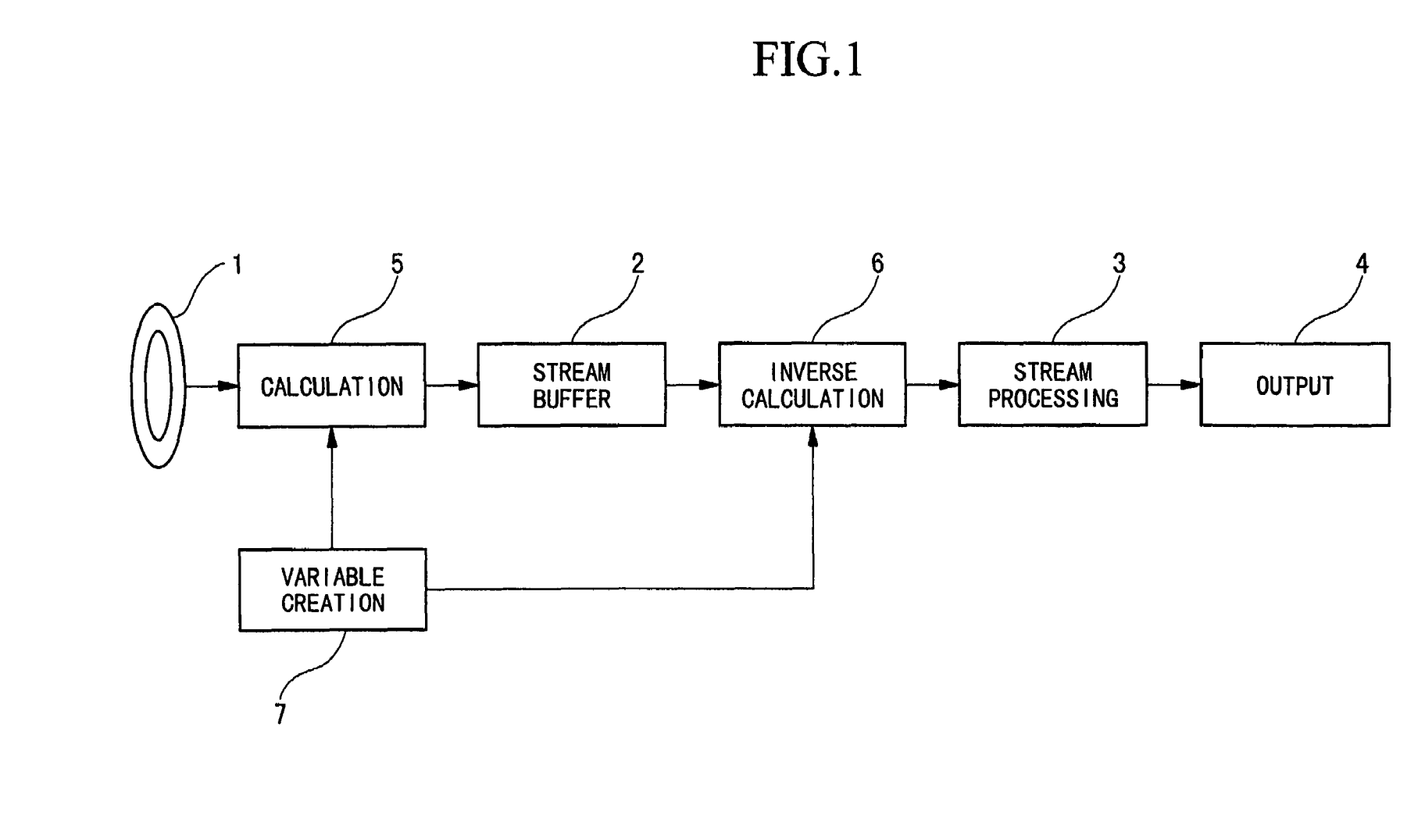
FIG. 1 is a block diagram showing a configuration of a data transmission system in accordance with an embodiment of the invention.

FIG. 1 is a block diagram showing a configuration of a data transmission system in accordance with an embodiment of the invention. In FIG. 1, data streams are read from a recording medium 1 and are then subjected to calculations in a calculation unit 5. Then, results of the calculations are stored in a stream buffer 2.

The calculation unit 5 requires variables for performing the calculation on the data streams. Such variables are produced by a variable creation unit 7.

The variable creation unit 7 is capable of arbitrarily changing the variables. The stream buffer 2 stores "calculated" data streams which are produced by the calculation unit 5 that performs the calculations on the "original" data streams read from the recording medium 1. An inverse calculation unit 6 reproduces the data streams based on the calculated data streams. Then, a stream processing unit 3 performs data processing on the data streams output from the inverse calculation unit 6. Incidentally, the inverse calculation unit 6 uses the same variables created by the variable creation unit 7.

Figure 2:
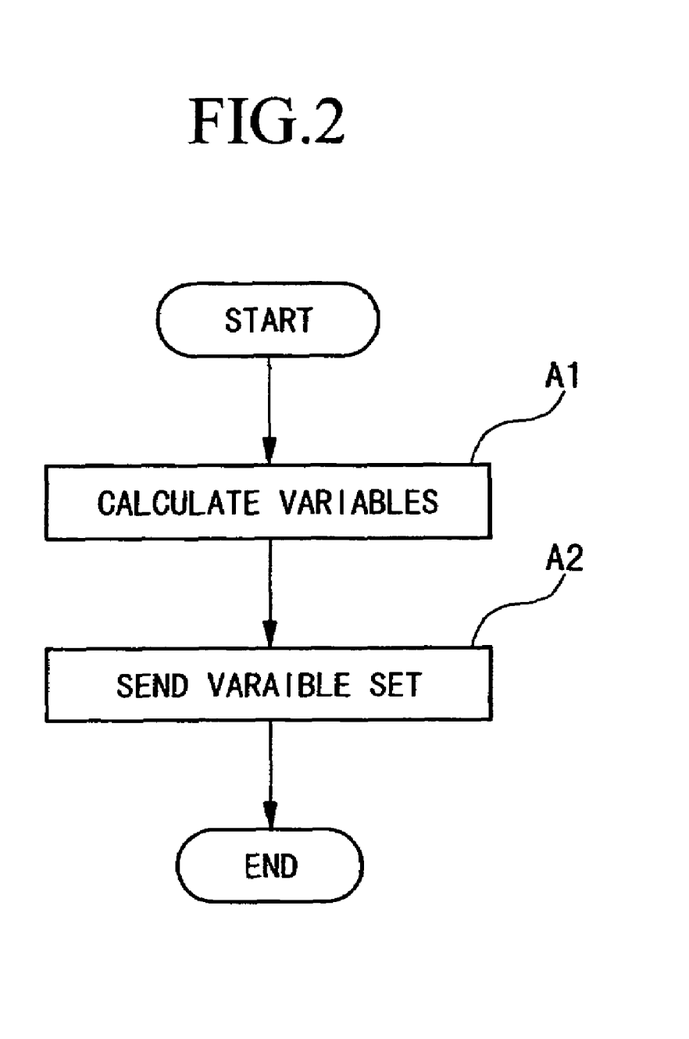
FIG. 2 is a flowchart showing procedures for creation of variables.
Figure 3:
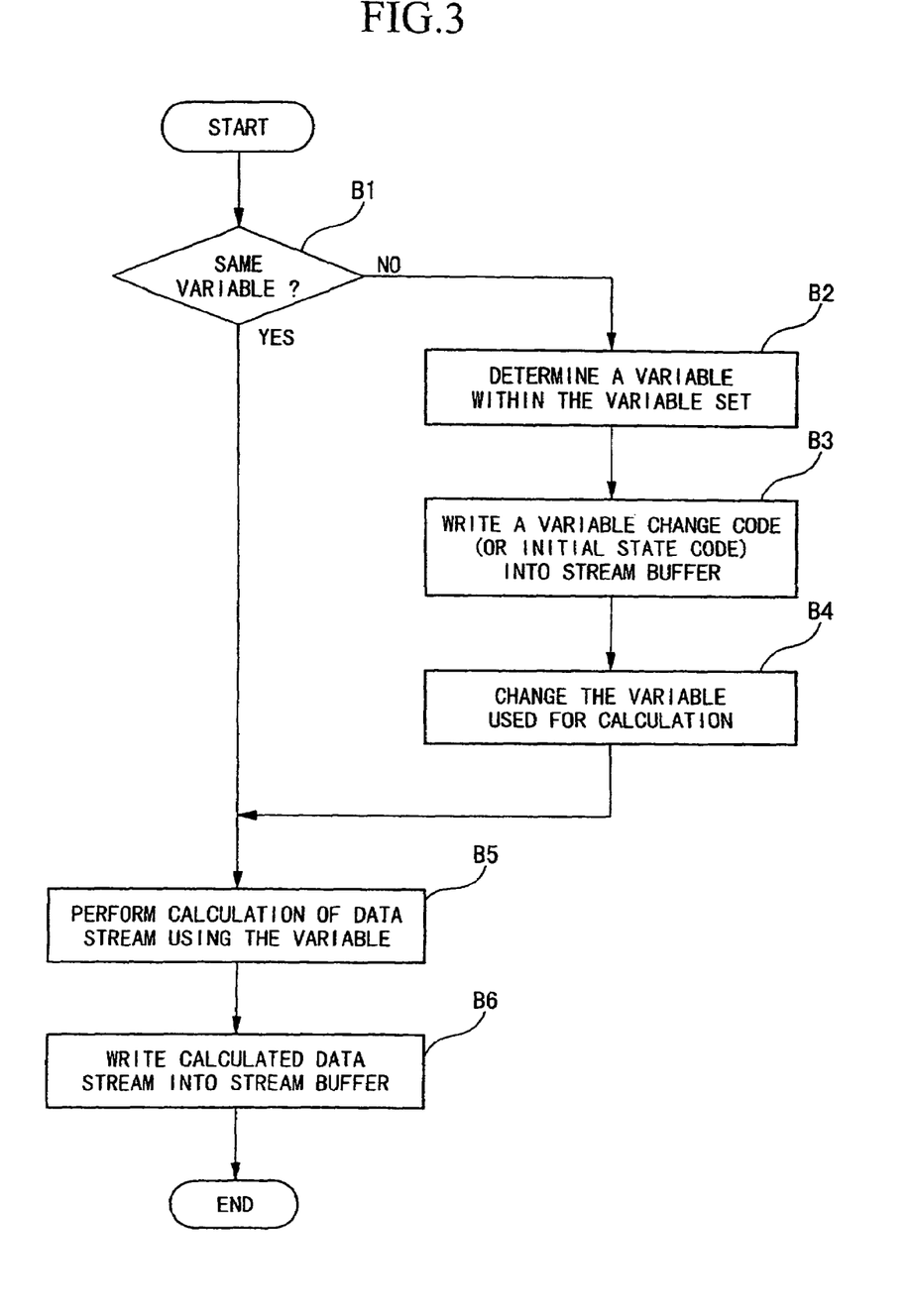
FIG. 3 is a flowchart showing procedures for calculations of data streams using the variables.

Next, a description will be given in detail with respect to operations of the data transmission system of FIG. 1 with reference to the block diagram of FIG. 1 as well as flowcharts of FIGS. 2, 3 and 4.

The block diagram of FIG. 1 shows functional blocks which are used to perform operational processes (e.g., calculations) on the data streams read from the recording medium 1. As described above, the data streams read from the recording medium 1 are subjected to the calculations in the calculation unit 5, which produces the calculated data streams. Then, the calculated data streams are temporarily stored in the stream buffer 2.

The calculation unit 5 performs the calculations on the data streams by using the variables which are created by the variable creation unit 7.

Now, procedures for creation of the variables in the variable creation unit 7 will be described with reference to the flowchart of FIG. 2. When receiving a variable creation request, the variable creation unit 7 creates a number of variables in step A1. All of the variables are sent to the calculation unit 5 and the inverse calculation unit 6 respectively in step A2.

Incidentally, such a number of variables which are created by the variable creation unit 7 at a time will be referred to as a set of variables (or variable set). The variables used for the calculations and inverse calculations are changed at the arbitrary timing(s), so the same variables may not be used again for the calculations and inverse calculations.

Next, a description will be given with respect to the calculations that the calculation unit 5 performs on the data streams by using the variables created by the variable creation unit 7 with reference to the flowchart of FIG. 3. As described above, the calculation unit 5 receives a number of the variables from the variable creation unit 7 while using a certain variable for the calculation. Herein, the calculation unit 5 makes a decision as to whether the variables presently received differ from the variable presently used for the calculation or not in step B1. If the presently received variables differ from the presently used variable, the calculation unit 5 changes the variable. If not, in other words, if the presently received variables coincide with the presently used variable, the calculation unit 5 continues to use the presently used variable for the calculation.

When changing the variable, the calculation unit 5 arbitrarily selects a variable to be used at this timing from a "new" variable set which is sent thereto from the variable creation unit 7 in step B2. Herein, the calculation unit 5 writes a variable change code into the stream buffer 2 so as to inform the inverse calculation unit 6 of a change event that the variable is changed and information representing a number of the selected variable within the variables of the new variable set given from the variable creation unit 7.

Incidentally, the calculation unit 5 writes the variable change code into the stream buffer 2 after completing the calculation thereof using the "present" variable. If the system as a whole is placed in an initial state, the calculation unit 5 writes an initial state code into the stream buffer 2. Then, the calculation unit 5 performs calculation using an initial variable to produce a variable change code, which is written into the stream buffer 2.

Thereafter, the calculation unit 5 changes the variable thereof in step B4.

As described above, a certain variable is established for the calculation in the next cycle. Then, the calculation unit 5 performs calculation using such an established variable on the data stream in step B5. Thereafter, the "calculated" data stream is written into the stream buffer 2 in step B6.

Next, a description will be given with respect to the inverse calculations by which the inverse calculation unit 6 reproduces the data stream based on the calculated data stream read from the stream buffer 2 with reference to the flowchart of FIG. 4.

Figure 4:
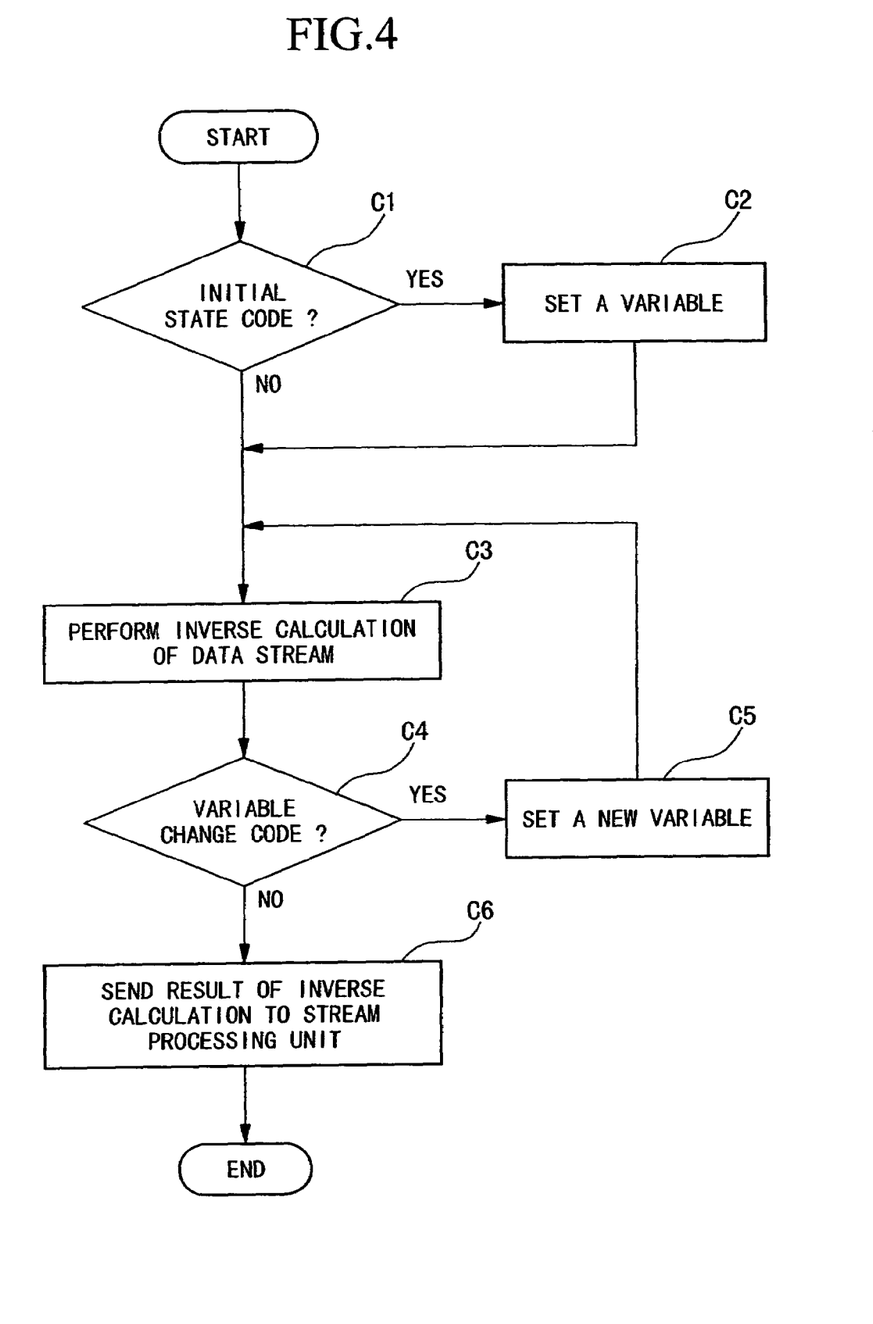
FIG. 4 is a flowchart showing procedures for inverse calculations to reproduce original data streams.

At first, the inverse calculation unit 6 proceeds to step C1 shown in FIG. 4. If the system is placed in an initial state, the initial state code is written into the stream buffer 2. Therefore, if the inverse calculation unit 6 captures the initial state code from the stream buffer 2, it determines that the system is in the initial state. In contrast, if the inverse calculation unit 6 does not detect the initial state code, it determines that the system is no longer placed in the initial state.

If the inverse calculation unit 6 determines that the system is in the initial state, it reads the variable change code which is written in the stream buffer 2 to follow the initial state code. Then, using the initial variable which is set to the inverse calculation unit 6 in advance, the inverse calculation unit 6 analyzes the variable change code to detect information representing the number of the selected variable within the variable set given from the variable creation unit 7. In response to the information, the inverse calculation unit 6 sets a variable which is used for the inverse calculation in this cycle in step C2.

Incidentally, the initial variable set to the inverse calculation unit 6 is identical to the initial variable set to the calculation unit 5.

Using the variable presently set, the inverse calculation unit 6 performs the inverse calculation on the calculated data stream output from the stream buffer 4 in step C3. In step C4, the inverse calculation unit 6 makes a decision as to whether the data stream presently captured from the stream buffer 2 contains the variable change code or not.

If the inverse calculation unit 6 determines that the data stream does not contain the variable change code, it performs the inverse calculation to reproduce the data stream, which is forwarded to the stream processing unit 3 in step C6.

In contrast, if the inverse calculation unit 6 determines that the data stream contains the variable change code, it captures the information representing the number of the selected variable within the variable set given from the variable creation unit 7. In response to the information, the inverse calculation unit 6 newly sets a variable which is used for inverse calculation in this cycle in step C5. Using the variable newly set, the inverse calculation unit 6 performs the inverse calculation again on the calculated data stream.

Incidentally, it is possible to employ any types of the (inverse) calculations for the data streams. However, it is necessary to perform the (inverse) calculations with respect to each of prescribed units of data that the stream processing unit 3 is capable of dealing with at a time.

Because, if the (inverse) calculations are performed beyond a range of data that the stream processing unit 3 is capable of processing, there exists an "excessive" amount of data stream(s) that the stream processing unit 3 is incapable of accepting. In that case, such an excessive amount of data stream(s) should be temporarily stored on the stream buffer 2. That is, the calculations of the data streams may be meaningless.

Next, a description will be given with respect to a modified example of the data transmission system with reference to FIG. 5.

Figure 5:
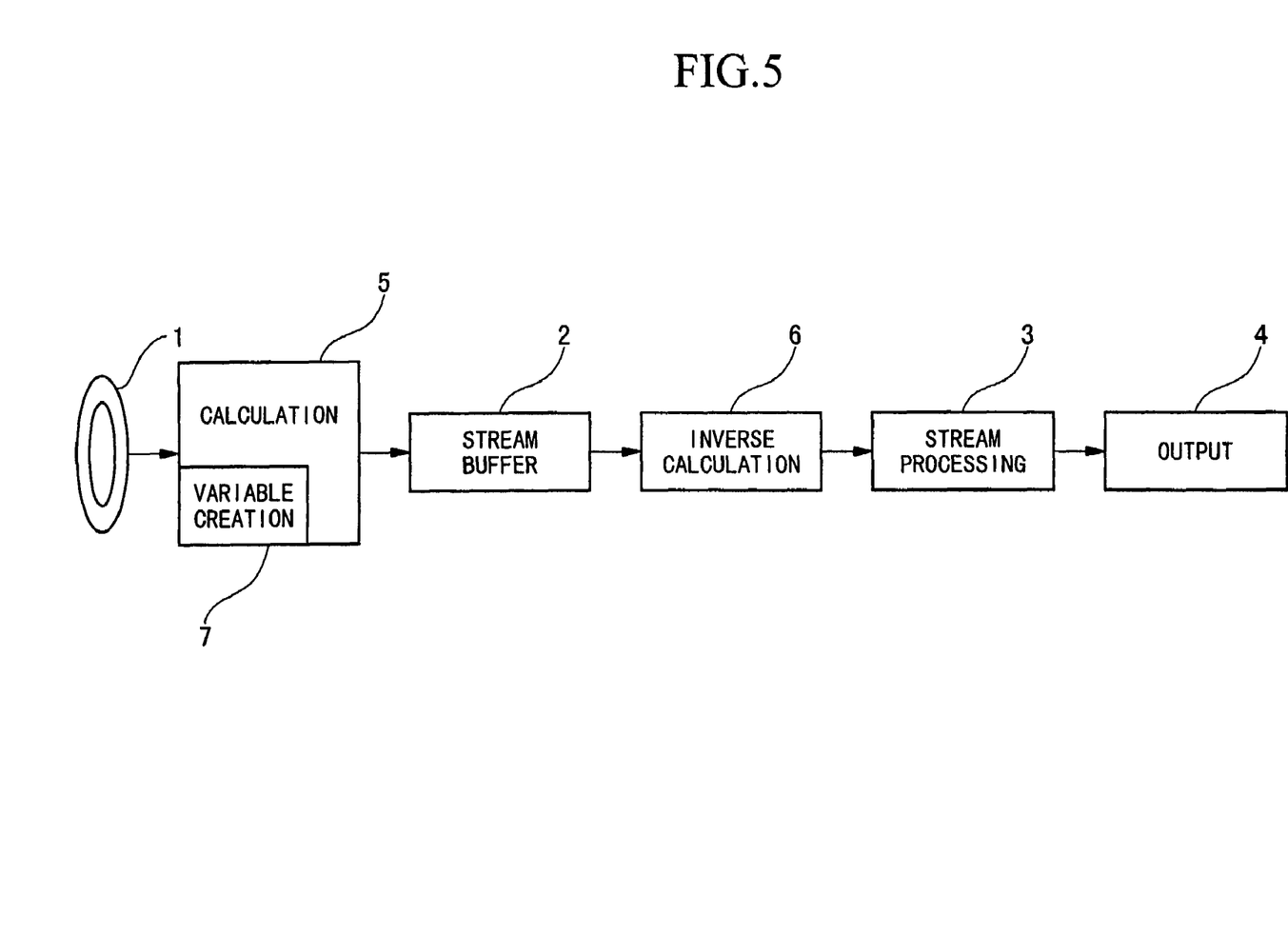
FIG. 5 is a block diagram showing a modified example of the data transmission system.

As compared with the aforementioned data transmission system of FIG. 1, the data transmission system of the modified example shown in FIG. 5 is characterized by that the variable creation unit 7 is provided inside of the calculation unit 5. Herein, a variable presently created by the variable creation unit 7 is subjected to calculation using a preceding variable together with the variable change code. Then, the calculated variable is written into the stream buffer 2 to follow the variable change code.

The modified example of the data transmission system does not need to provide the foregoing information representing the number of the variable selected within the variables created by the variable creation unit 7.

Next, when detecting the variable change code, the inverse calculation unit 6 is capable of capturing the variable used for the inverse calculation in the next cycle directly from the stream buffer 2. Therefore, the modified example of FIG. 5 is capable of demonstrating the same effects of the foregoing data transmission system of FIG. 1.

It is necessary to share the variable used for both of the calculation and inverse calculation. In the modified example, such variable is created by the variable creation unit 7 and is delivered to both of the calculation unit 5 and the inverse calculation unit 6.

Incidentally, the modified example copes with the difference between the timings to perform the calculation and inverse calculation respectively, as follows:

The variable change code is inserted into the data stream(s) in conformity with the "variable change" timing at the calculation unit 5. So, the inverse calculation unit 6 changes the variable thereof at the timing to detect the variable change code.

As described heretofore, this invention is designed such that the original data streams do not exist on the buffer memory. Thus, this invention is capable of inhibiting the third party (or someone) to easily capture the "original" data streams recorded on the recording medium from the buffer memory.

In addition, even if the third party succeeds to capture the data streams from the data transmission system of this invention, it is difficult for the third party to easily decode the "calculated" data streams stored on the buffer memory.

As described heretofore, this invention is capable of offering a variety of effects, which can be summarized as follows:

(1) Even if the third party succeeds to capture the stored contents of the intermediate buffer memory, it is difficult for the third party to analyze them. So, this invention is capable of inhibitting the third party to have a chance to easily capture the "original" data streams recorded on the recording medium. Thus, it is possible to prevent the third party from easily reproducing a duplicate recording the original data streams of the recording medium.

(2) Because, this invention is designed to store the "calculated (or coded" data streams on the intermediate buffer memory, it is not easy for the third party to capture the original data streams from the intermediate buffer memory. In addition, the calculations do not always use the same variable(s). In other words, the variables may be changed at random. Further, the variable creation unit creates a number of variables (i.e., variable set) every time the calculation is performed. Furthermore, the calculation in each cycle uses a certain variable which is chosen arbitrarily from the variable set. Thus, it is very difficult for the third party to specify the variable(s).

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A data transmission system comprising:
calculation means for performing calculation using a variable on an original data stream read from a recording medium so as to produce a calculated data stream;
variable creation means for creating the variable;
a stream buffer for temporarily storing the calculated data stream therein;
inverse calculation means for performing inverse calculation on the calculated data stream output from the stream buffer by using the variable so as to reproduce the data stream;
stream processing means for processing the reproduced data stream to produce a processed data stream; and
output means for outputting the processed data stream,
wherein the variable is changeable at a regular timing or at a random timing.

2. A data transmission system according to claim 1 wherein the data stream read from the recording medium corresponds to an amount of data which can be processed at a time.

3. A data transmission system according to claim 2 wherein a variable change code representing a message that the variable is changed is produced by the calculation using the variable and is temporarily stored in the stream buffer together with the calculated data stream.

4. A data transmission system according to claim 1 wherein a variable change code representing a message that the variable is changed is produced by the calculation using the variable and is temporarily stored in the stream buffer together with the calculated data stream.

5. A data transmission system comprising:
  calculation means for performing calculation using a variable on an original data stream read from a recording medium so as to produce a calculated data stream;
  variable creation means for creating a number of variables, one of which is arbitrarily chosen as the variable used for the calculation;
  a stream buffer for temporarily storing the calculated data stream therein;
  inverse calculation means for performing inverse calculation on the calculated data streams output from the stream buffer to reproduce the data stream;
  stream processing means for processing the reproduced data stream to produce a processed data stream; and
  output means for outputting the processed data stream.

6. A data transmission system according to claim 5 wherein the data stream read from the recording medium corresponds to an amount of data which can be processed at a time.

7. A data transmission system according to claim 6 wherein a variable change code representing a message that the variable is changed is produced by the calculation using the variable and is temporarily stored in the stream buffer together with the calculated data stream.

8. A data transmission system according to claim 5 wherein a variable change code representing a message that the variable is changed is produced by the calculation using the variable and is temporarily stored in the stream buffer together with the calculated data stream.

9. A data transmission system comprising:
  variable creation means for creating a variable set consisting of a number of variables;
  calculation means for receiving an original data stream read from a recording medium so as to perform calculation on the original data stream by use of a variable which is selected from the variable set given from the variable creation means, so that the calculation means produces a calculated data stream based on the original data stream as well as a variable change code representing the variable selected from the variable set;
  a stream buffer for temporarily storing the calculated data stream together with the variable change code;
  inverse calculation means for performing inverse calculation on the calculated data stream output from the stream buffer by use of the variable which is selected from the variable set in accordance with the variable change code, so that the inverse calculation means reproduces the data steam based on the calculated data stream;
  stream processing means for processing the reproduced data stream so as to produce a processed data stream; and
  output means for outputting the processed data stream.

10. A data transmission system according to claim 9 wherein the variable creation means creates the variable set in each cycle while the variable selected from the variable set is changed in each cycle of the calculation, so that the calculation and the inverse calculation are respectively performed using a same changed variable designated by the variable change code in each cycle.

11. A data transmission system comprising:
  calculation means for performing calculation using an original data stream read from a recording medium by use of at least one variable that is designated, thus producing a calculated data stream;
  variable designation means for designating the variable, which is periodically changed per each cycle in response to a variable change code;
  a stream buffer for temporarily storing the calculated data stream together with the variable change code therefor;
  inverse calculation means for performing inverse calculation on the calculated data stream output from the stream buffer by use of the same variable used in the calculation, thus reproducing the data stream;
  stream processing means for processing the reproduced data stream to produce a processed data stream; and
  output means for outputting the processed data stream.

12. A data transmission system comprising:
  calculation means for performing calculation using a variable on an original data stream read from a recording medium so as to produce a calculated data stream;
  variable creation means for creating the variable;
  a stream buffer for temporarily storing the calculated data stream therein;
  inverse calculation means for performing inverse calculation on the calculated data stream output from the stream buffer by using the variable so as to reproduce the data stream;
  means for supplying the variable to both the calculation means and the inverse calculation means;
  stream processing means for processing the reproduced data stream to produce a processed data stream; and
  output means for outputting the processed data stream,
  wherein the variable used by the inverse calculation means is updated in conformity with a variable update timing inserted into the data stream.

13. A data transmission system comprising:
  calculation means for performing calculation using a variable on an original data stream read from a recording medium so as to produce a calculated data stream;
  variable creation means for creating the variable;
  a stream buffer for temporarily storing the calculated data stream therein; and
  inverse calculation means for performing inverse calculation on the calculated data stream output from the stream buffer by using the variable so as to produce a data stream,
  wherein the variable is changeable at a regular timing or at a random timing, which is notified to the inverse calculation means through the stream buffer.

* * * * *